(12) United States Patent
Galizio et al.

(10) Patent No.: US 10,246,581 B2
(45) Date of Patent: Apr. 2, 2019

(54) RUBBER COMPOSITIONS CONTAINING WHEY PROTEIN

(71) Applicant: Bridgestone Americas Tire Operations, LLC, Nashville, TN (US)

(72) Inventors: Benjamin C. Galizio, Kent, OH (US); Amy M. Randall, Akron, OH (US); Melissa M. Clark, Woodland Park, CO (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/537,043

(22) PCT Filed: Jun. 11, 2015

(86) PCT No.: PCT/US2015/035264
§ 371 (c)(1),
(2) Date: Jun. 16, 2017

(87) PCT Pub. No.: WO2016/099599
PCT Pub. Date: Jun. 23, 2016

(65) Prior Publication Data
US 2017/0342253 A1 Nov. 30, 2017

Related U.S. Application Data

(60) Provisional application No. 62/093,596, filed on Dec. 18, 2014.

(51) Int. Cl.
| | | |
|---|---|---|
| *C08L 23/28* | (2006.01) | |
| *C08K 3/013* | (2018.01) | |
| *B60C 1/00* | (2006.01) | |
| *C08K 3/04* | (2006.01) | |
| *C08K 3/34* | (2006.01) | |
| *C08K 3/36* | (2006.01) | |
| *C08L 9/00* | (2006.01) | |
| *C08L 21/00* | (2006.01) | |
| *C08L 89/00* | (2006.01) | |

(52) U.S. Cl.
CPC .......... *C08L 23/283* (2013.01); *B60C 1/0008* (2013.01); *C08K 3/013* (2018.01); *C08K 3/04* (2013.01); *C08K 3/346* (2013.01); *C08K 3/36* (2013.01); *C08L 9/00* (2013.01); *C08L 21/00* (2013.01); *C08L 89/00* (2013.01)

(58) Field of Classification Search
CPC ........ C08L 23/283; C08L 89/00; C08L 21/00; C08L 9/00; C08K 3/04; C08K 3/36; C08K 3/346
USPC .......................................................... 524/17
See application file for complete search history.

(56) References Cited

U.S. PATENT DOCUMENTS

| | | | |
|---|---|---|---|
| 2,098,037 A | 11/1937 | Hazell et al. | |
| 2,098,038 A | 11/1937 | Hazell et al. | |
| 2,127,560 A | 8/1938 | Haslam | |
| 2,931,845 A | 4/1960 | Rene et al. | |
| 3,113,605 A | 12/1963 | Feutterer | |
| 5,272,190 A | 12/1993 | Haruki et al. | |
| 5,302,636 A | 4/1994 | Hiroshi et al. | |
| 6,780,925 B2 | 8/2004 | Materne et al. | |
| 6,835,769 B2 | 12/2004 | Custodero et al. | |
| 2002/0004549 A1 | 1/2002 | Custodero et al. | |
| 2003/0100643 A1 | 5/2003 | Kikuchi | |
| 2003/0135006 A1 | 7/2003 | Thierry et al. | |
| 2004/0030028 A1 | 2/2004 | Resendes et al. | |
| 2005/0075422 A1 | 4/2005 | Resendes et al. | |
| 2005/0085582 A1 | 4/2005 | Galimbreti et al. | |
| 2005/0277712 A1 | 12/2005 | Daly | |
| 2006/0252879 A1 | 11/2006 | Yasuyuki et al. | |
| 2008/0108733 A1 | 5/2008 | Howard et al. | |
| 2008/0236716 A1 | 10/2008 | Bergman et al. | |
| 2009/0232876 A1 | 9/2009 | Montes et al. | |
| 2012/0183794 A1 | 7/2012 | Guo et al. | |
| 2013/0150498 A1* | 6/2013 | Basu | C08L 1/12 524/40 |
| 2013/0263520 A1 | 10/2013 | Houga et al. | |
| 2013/0312890 A1 | 11/2013 | Iwata et al. | |
| 2015/0159001 A1* | 6/2015 | Qu | C08L 7/02 525/132 |

FOREIGN PATENT DOCUMENTS

| | | |
|---|---|---|
| CN | 101240049 A | 8/2008 |
| CN | 101967239 A | 2/2011 |
| CN | 103772532 A | 5/2014 |
| DE | 19622169 A1 | 12/1996 |
| EP | 1234852 A1 | 6/2013 |

(Continued)

OTHER PUBLICATIONS

Wikipedia, Whey protein, Jun. 4, 2018. (Year: 2018).*
Alder-Nissen, Jens, "Determination of the Degree of Hydrolysis of Food Protein Hydrolysates by Trinitrobenzenesulfonic acid," J. Agric. Food Chem., vol. 27, No. 6, pp. 1256-1262 (1979).
Section 7.2 (Titanium Dioxide) from Basic Rubber Testing: Selecting Methods for a Rubber Test Program, editor John S. Dick, 2003.
Etzel, Mark R., "Manufacture and Use of Dairy Protein Fractions," J. of Nutrition, vol. 134, No. 4, pp. 996S-1002S (2004).
Fitzgerald, Richard J. et al., "Hypotensive Peptides from Milk Proteins," J. of Nutrition, vol. 134, No. 4, pp. 980S-998S (2004).
GNC Pro Performance 100% Whey Protein—Vanilla Cream, downloaded Jun. 10, 2014.
Hoogwegt U.S. Inc., Acid Whey Protein, downloaded Jun. 25, 2014 (1 page).

(Continued)

*Primary Examiner* — Hui H Chin
(74) *Attorney, Agent, or Firm* — Meredith E. Hooker; Jenny Sheaffer

(57) ABSTRACT

The present disclosure is directed to rubber compositions comprising a butyl rubber or a halogenated butyl rubber, at least one filler, and a whey protein component. The whey protein component is present in an amount sufficient to provide about 0.1 to about 10 phr whey protein in the rubber composition. The present disclosure is also directed to methods of preparing such rubber compositions and to a tire innerliner or innertube containing the rubber compositions disclosed herein.

20 Claims, 2 Drawing Sheets

(56) References Cited

FOREIGN PATENT DOCUMENTS

| | | |
|---|---|---|
| EP | 2604651 A1 | 6/2013 |
| GB | 754939 A | 8/1956 |
| GB | 766509 | 1/1957 |
| JP | S58-087141 A | 5/1983 |
| JP | H06-166771 A | 6/1994 |
| JP | 2000038477 A | 2/2000 |
| JP | 2002-249987 A | 9/2002 |
| JP | 2009-029991 A | 9/2009 |
| JP | 2014-062269 A | 4/2014 |
| WO | 03037655 A1 | 5/2003 |
| WO | 2010016466 A1 | 2/2010 |
| WO | 2013023229 A1 | 2/2013 |
| WO | 2013081138 A1 | 6/2013 |
| WO | 2013092095 A1 | 6/2013 |
| WO | 2014036758 A1 | 3/2014 |

OTHER PUBLICATIONS

Hoogwegt U.S. Inc., Reduced Lactose Whey Protein, downloaded Jun. 25, 2014 (1 page).
Hoogwegt U.S. Inc., Reduced Minerals Whey Protein, downloaded Jun. 25, 2014 (1 page).
Hoogwegt U.S. Inc., Sweet Whey Powder, downloaded Jun. 25, 2014 (1 page).
Hoogwegt U.S. Inc., Whey Protein Concentrate, downloaded Jun. 25, 2014 (1 page).
Hoogwegt U.S., Inc., Whey Protein Isolate, downloaded Jun. 25, 2014 (1 page).
Jong, L., "Effect of Soy Protein Concentrate in Elastomer Composites," Composites Part A: Applied Science and Manufacturing, vol. 37, issue 3, Mar. 2006, pp. 438-446.
Jong, Lei, Characterization of Soy Protein/Styrene-Butadiene Rubber Composites, Composites Part A: Applied Science and Manufacturing, vol. 36, issue 5, May 2005, pp. 675-682.
Chapter 7 (title: Nonfood Applications of Milk Proteins: A Review), from Colloids in Biotechnology, by Kalicka et al., 2010.
Kronos 1000, titanium dioxide, copyright 2014.
Milk Facts, downloaded Jun. 9, 2014 (4 pages).
Burrington, Kimberlee (K.J.), Technical Report Milk Fractionation Technology and Emerging Milk Protein Opportunities, copyright 2013 (8 pages).
Morias et al., "Correlation between the Degree of Hydrolysis and the Peptide Profile of Whey Protein Concentrate Hydrolysates: Effect of the Enzyme Type and Reaction Time," Am. J. Food Tech., vol. 8, issue 1, pp. 1-16, 2013.
Sarkawi, S.S., et al., "The Influence of Non-Rubber Constituents on Performance of Silica Reinforced Natural Rubber Compounds," European Polymer Journal, vol. 48, issue 10, Oct. 2013, pp. 3199-3209.
Titanium Oxide, Wikipedia, downloaded Jun. 1, 2015 (2 pages).
International Search Report and Written Opinion from PCT application No. PCT/US2015/064509, dated Apr. 20, 2016 (12 pages).
International Search Report and Written Opinion from PCT application No. PCT/US2015/035258, dated Sep. 15, 2015 (11 pages).
International Search Report and Written Opinion from PCT application No. PCT/US2015/035255, dated Sep. 15, 2015 (12 pages).
International Search Report and Written Opinion from PCT application No. PCT/US2015/035264, dated Sep. 14, 2015 (10 pages).
Han, X.Q. et al., Journal of Agricultural and Food Chemistry, vol. 44, No. 5, pp. 1211-1217 (1996).
Goodall, S., et al., "Selective Separation of the Major Whey Proteins Using Ion Exchange Membranes," J. of Dairy Science, vol. 91, pp. 1-10 (2008).
Sharma, Suraj et al., "Whey Based Binary Bioplastics," J. of Food Eng., vol. 119, pp. 404-410 (2013).
Bhattacharya, Amit, Polymer Grafting and Crosslinking, copyright 2009, screen shot of excerpt (first paragraph only) of page 48.
Nocil Limiited, Vulcanization & Accelerators, Dec. 2010, downloaded from http://nocil.com/Downloadfile/DTechnicalNote-Vulcanization-Dec10.pdf.
International Preliminary Report on Patentability from PCT application No. PCT/US2015/064509, dated Jun. 20, 2017 (9 pages).
International Preliminary Report on Patentability from PCT application No. PCT/US2015/035258, dated Jun. 20, 2017 (8 pages).
International Preliminary Report on Patentability from PCT application No. PCT/US2015/035255, dated Jun. 21, 2017 (9 pages).
International Preliminary Report on Patentabilityfrom PCT application No. PCT/US2015/035264, dated Jun. 21, 2017 (7 pages).
Morr, C.V., Whey and Lactose Processing, edited by J. G. Zadow, Chapter 4, "Whey Utilization," pp. 133-143, copyright 1992.
Hudson, H.M., et al., "Rheological and Physical Properties of Derivitized Whey Protein Isolate Powders," J. Agric. Food Chemistry, vol. 48, pp. 3112-3119, 2000.
European Search Report and Opinion from EP application No. 15870496.5 with EP communication dated May 4, 2018.
Office action from U.S. Appl. No. 14/736,709 dated May 2016.
Office action from U.S. Appl. No. 14/736,709 dated Sep. 2016.
Office action from U.S. Appl. No. 14/736,709 dated Mar. 2017.
Office action from U.S. Appl. No. 14/736,709 dated Jul. 2017.
Office action from U.S. Appl. No. 14/736,709 dated Sep. 2017.
Office action from U.S. Appl. No. 14/736,709 dated Feb. 2018.
Office action from U.S. Appl. No. 14/736,709 dated Aug. 2018.
Response filed in U.S. Appl. No. 14/736,709 dated Aug. 2016.
Response filed in U.S. Appl. No. 14/736,709 dated Dec. 2016.
Response filed in U.S. Appl. No. 14/736,709 dated Jun. 2017.
Response filed in U.S. Appl. No. 14/736,709 dated Sep. 2017.
Response filed in U.S. Appl. No. 14/736,709 dated Jan. 2018.
Response filed in U.S. Appl. No. 14/736,709 dated Jun. 2018.
Response filed in U.S. Appl. No. 14/736,709 dated Oct. 2018.
Office action from U.S. Appl. No. 15/536,729 dated Jul. 2018.
Response filed in U.S. Appl. No. 15/536,729 dated Oct. 2018.
Eastman Cellulose-Based Specialty Polymers, Oct. 2014 (32 pages).
International Institute of Synthetic Rubber Products, Inc., "Butyl Rubber", downloaded on Jun. 1, 2015 from https://isrp.com/wp-content/uploads/02ButylRubberIIR16Aug2012.pdf (5 pages).

* cited by examiner

RUBBER COMPOSITIONS CONTAINING WHEY PROTEIN

FIELD OF THE DISCLOSURE

The present disclosure relates to rubber compositions comprising at least one of a butyl rubber or a halogenated butyl rubber, at least one filler and a whey protein component, and also to related methods. The present disclosure also relates to tire components containing the rubber compositions disclosed herein.

BACKGROUND

Rubber compositions for tire innerliners or innertubes frequently comprise butyl rubber, halogenated butyl rubber, or both. These rubbers reduce air permeability (i.e., provide good air retention) and provide good durability to the tire innerliner or innertube. However, butyl rubbers and halogenated butyl rubbers can be very expensive. Therefore, tire manufacturers strive to balance the expense of the rubber composition with the performance of the innerliner or innertube.

SUMMARY OF THE INVENTION

Disclosed herein are rubber compositions comprising at least one of a butyl rubber or a halogenated butyl rubber, at least one filler and a whey protein component, and related methods. Also disclosed are tire components containing the rubber compositions disclosed herein.

In a first embodiment, a rubber composition comprising at least one of a butyl rubber or a halogenated butyl rubber, at least one filler, and a whey protein component is disclosed. The rubber composition comprises about 5 to about 200 phr of the filler, and the whey protein component is present in an amount sufficient to provide about 0.1 to about 10 phr of whey protein.

In a second embodiment, a rubber composition that has been subjected to curing is disclosed; the composition comprises at least one of a butyl rubber or a halogenated butyl rubber, at least one filler, whey protein, and a cure package. The rubber composition comprises about 5 to about 200 phr of the filler, and the whey protein is present in an amount of about 0.1 to about 10 phr.

In a third embodiment, a method for improving at least one of the green strength or the air permeability of a vulcanized rubber composition used in a tire innerliner or innertube is disclosed. The method comprises incorporating about 0.1 to about 10 phr of whey protein into the rubber composition that is used in the tire innerliner or innertube.

BRIEF DESCRIPTION OF THE DRAWINGS

In the accompanying drawings, structures are illustrated that, together with the detailed description provided below, describe exemplary embodiments of the claimed invention.

DETAILED DESCRIPTION

Figure 1:
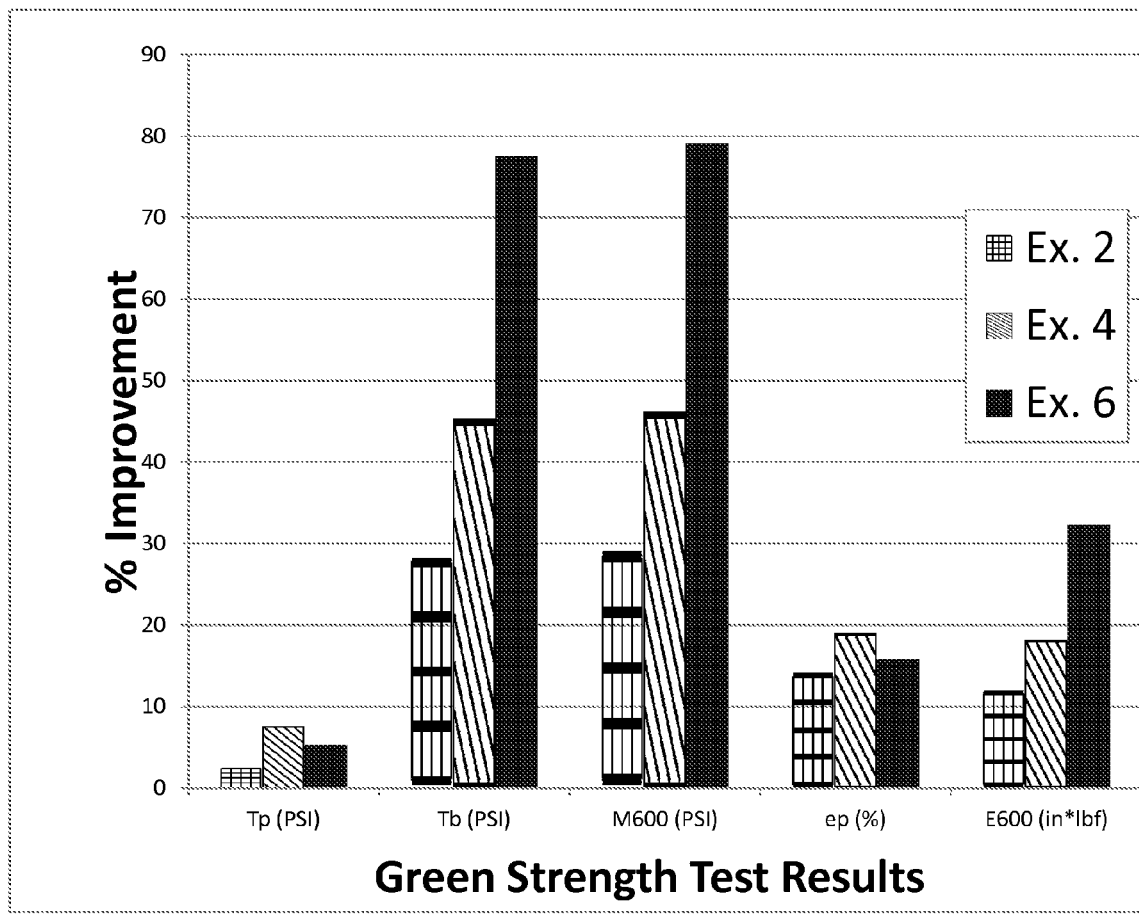
FIG. 1 is a graph showing the percentage improvement in green strength-related tensile properties for rubber compositions containing whey protein.

Disclosed herein are rubber compositions comprising at least one of a butyl rubber or a halogenated butyl rubber, at least one filler and a whey protein component, and related methods. Also disclosed are tire components containing the rubber compositions disclosed herein.

In a first embodiment, a rubber composition comprising at least one of a butyl rubber or a halogenated butyl rubber, at least one filler, and a whey protein component is disclosed. The rubber composition comprises about 5 to about 200 phr of the filler, and the whey protein component is present in an amount sufficient to provide about 0.1 to about 10 phr of whey protein.

In a second embodiment, a rubber composition that has been subjected to curing is disclosed; the composition comprises at least one of a butyl rubber or a halogenated butyl rubber, at least one filler, whey protein, and a cure package. The rubber composition comprises about 5 to about 200 phr of the filler, and the whey protein is present in an amount of about 0.1 to about 10 phr.

In a third embodiment, a method for improving at least one of the green strength or the air permeability of a vulcanized rubber composition used in a tire innerliner or innertube is disclosed. The method comprises incorporating about 0.1 to about 10 phr of whey protein into the rubber composition that is used in the tire innerliner or innertube.

Definitions

The terminology as set forth herein is for description of the embodiments only and should not be construed as limiting the invention as a whole.

As used herein, the term "phr" means the parts by weight per hundred parts of rubber. If the rubber composition comprises more than one rubber, "phr" means the parts by weight per hundred parts of the sum of all rubbers.

As used herein, the term "minority" means less than 50% by weight.

As used herein, the term "whey protein component" means a component which contains whey protein, but which also may include other materials such as water, minerals, fats, carbohydrates, etc.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

Whey Protein Component and Whey Protein

As discussed above, according to the first embodiment disclosed herein, the rubber composition comprises a whey protein component, and according to the second and third embodiments disclosed herein, the rubber composition comprises whey protein. As discussed in more detail below, the whey protein component is the source of whey protein in the resulting rubber composition.

Whey protein and casein protein are two types of protein found in milk (i.e., milk from cows, goats, sheep, humans, or other mammals). Whey protein refers generally to a group of milk proteins that remain soluble when liquid milk is acidified to a pH of 4.6 or lower. Casein proteins are the milk proteins that coagulate at acidic pH to become cheese, yogurt, or another solidified or semi-solidified milk product. After the coagulated casein protein solids are removed from acidified milk, the remaining liquid is referred to as whey; the whey typically contains whey protein along with varying amounts of carbohydrates (e.g., lactose), fats, and minerals.

Whey protein is a collection of globular proteins, which includes proteins such as alpha-lactalbumin, beta-lactoglobulin, immunoglobulin, and bovine serum albumin; while whey protein comprises a collection of proteins, for ease of reference it is referred to herein as "whey protein" in the singular. A majority of the proteins in the whey protein are a combination of alpha-lactalbumin and beta-lactoglobulin, which comprise about 25% and 65%, respectively, by weight of the whey protein in cow's milk. Although whey protein may comprise very minor amounts of individual amino acids or short-chain protein oligomers, the majority (i.e., more than 50%, including more than 75%, more than 90%, or even more than 95%) of the protein chains in whey protein have a molecular weight of greater than about 10 kDaltons (measured by a method such as gel electrophoresis). In certain embodiments of the first-third embodiments disclosed herein, the protein chains of the whey protein used in the rubber composition (or contained in the whey protein component) have a degree of hydrolysis that is less than about 50%. The degree of hydrolysis ("DH") is the percentage of peptide bonds cleaved when a protein is hydrolyzed to break the protein chain into shorter chains or individual amino acids. DH can be measured by any of several known methods, including pH stat measurement, trinitrobenzenesulfonic acid (TNBS) reaction, ortho-phthaldialdehyde (OPA) reaction, and formol titration. In certain embodiments of the first-third embodiments disclosed herein, the whey protein used in the rubber composition (or contained in the whey protein component) has a DH that is less than about 30%, including less than 30%, less than about 25%, less than 25%, less than about 20%, less than 20%, less than about 15%, less than 15%, less than about 10%, less than 10%, less than about 5%, less than 5%, less than about 3%, and less than 3%. In certain embodiments according to the first-third embodiments disclosed herein, the whey protein in the whey protein component meets at least one of the preceding attributes relating to DH.

All proteins are comprised of building blocks of amino acids. The protein chains of whey protein contain a relatively high percentage of branched-chain amino acids (BCAAs), particularly leucine. Due to the amino acid profile of whey protein, it contains significant amounts of sulfur, but essentially no phosphate (phosphorus). Thus, in certain embodiments, the whey protein component used in the rubber compositions or the whey protein contained in the rubber compositions according to the first-third embodiments can be described as phosphate (or phosphorus) free or essentially phosphate (or phosphorus) free. Casein protein, in contrast, has a different amino acid profile and comprises primarily alpha-caseins, beta-casein, and kappa-casein. Due to the amino acid profile of casein protein, it contains significant amounts of phosphate (phosphorus), but little sulfur.

Whey with a pH of about 5.1 or greater is called "sweet whey," and is a byproduct of hard cheese production. Sweet whey protein is commercially valuable for making ricotta cheese and as an animal feed or fertilizer. However, the whey that results from making soft cheese, cottage cheese, and yogurt typically has a pH less than 5.1. This so-called "acid whey" and the acid whey protein in it have traditionally had little commercial value.

When whey is first separated from milk, the whey is mostly water (e.g., greater than about 90% water by weight), but it also contains whey proteins, fats, carbohydrates (e.g., lactose), minerals (e.g., calcium), and other milk-based materials (e.g., cholesterol). Thus, for the purpose of this disclosure, whey may be considered a whey protein component. However, the high aqueous content of most whey and its relatively low protein content (generally less than 1%) makes its use as a whey protein component in the rubber compositions according to the first-third embodiments disclosed herein is less preferred, although possible. To make a more practical whey protein component (or source of whey protein) for use in the rubber compositions according to the first-third embodiments disclosed herein, the whey may be processed to: remove some or all of the water; increase the concentration of the whey proteins; remove non-protein materials; or combinations of the foregoing. Such processed forms of whey are commercially available and may be sold under names including acid whey protein, reduced lactose whey, reduced minerals whey, sweet whey powder, whey powder concentrate, and whey protein isolate. Accordingly, in certain embodiments of the first-third embodiments disclosed herein the whey protein component comprises (or the whey protein is sourced from) at least one of acid whey powder, reduced lactose whey, reduced minerals whey, sweet whey powder, whey protein concentrate, and whey protein isolate. In certain of the foregoing embodiments, the whey protein component (or whey protein) is sourced from cow's milk (due to the general prevalence of cow's milk), and in other embodiments it is sourced from a non-human animal.

In certain embodiments according to the first-third embodiments disclosed herein, the whey protein component (or source of the whey protein) comprises a powder (i.e., whey powder). Whey powder may be formed by drying liquid whey (i.e., acid whey or sweet whey) to a solid, scoopable powder (i.e., acid whey powder or sweet whey powder). Whey powder may still have some residual water in the composition, but is essentially a dry powder when used as a whey protein component. In certain embodiments according to the first-third embodiments disclosed herein, the whey protein component (or source of the whey protein) comprises acid whey powder, sweet whey powder, or a combination thereof. In certain such embodiments, the acid whey powder comprises about 10 to about 15% by weight whey protein (including 10 to 15% by weight). In another embodiment of the first-third embodiments disclosed herein, the whey protein component (or source of the whey protein) comprises reduced lactose whey. Reduced lactose whey may be formed by treating liquid whey to remove some or all of the water and lactose to form reduced lactose whey. In certain embodiments of the first-third embodiments disclosed herein, the reduced lactose whey comprises about 15 to about 30% by weight (including 15 to 30% by weight) whey protein. In another embodiment of the first-third embodiments disclosed herein, the whey protein component (or source of the whey protein) comprises reduced minerals whey. Reduced minerals whey may be formed by treating liquid whey to remove some or all of the water and minerals (e.g., calcium) to form reduced minerals whey. In certain embodiments of the first-third embodiments disclosed herein, the reduced minerals whey comprises about 10 to about 15% by weight (including 10 to 15% by weight) whey protein. In another embodiment of the first-third embodiments disclosed herein, the whey protein component (or source of the whey protein) comprises whey protein concentrate (WPC). WPC may be formed by treating liquid whey to remove a significant portion of the water. WPC may still have other milk components (e.g., fats, lactose, minerals, etc.) present in significant amounts. In certain embodiments of the first-third embodiments disclosed herein, the WPC comprises about 30 to about 85% by weight (including 30 to 85% by weight) whey protein. In another embodiment of the first-third embodiments disclosed herein, the whey protein component (or source of the whey protein) comprises whey protein isolate (WPI). WPI may be formed by treating liquid whey to remove much of the water, fat, lactose, and other non-protein components. In certain embodiments of the first-third embodiments disclosed herein, the WPI comprises at least about 90% whey protein by weight (including at least 90% whey protein by weight).

As discussed above, according to the first-third embodiments disclosed herein, the rubber composition comprises a whey protein component (or a source of whey protein) in an amount sufficient to provide about 0.1 to about 10 phr whey protein in the rubber composition. In certain such embodiments, the whey protein component is present in an amount sufficient to provide 0.1 to 10 phr (e.g., 0.1 phr, 0.2 phr, 0.25 phr, 0.3 phr, 0.4 phr, 0.5 phr, 1 phr, 2 phr, 3 phr, 4 phr, 5 phr, 6 phr, 7 phr, 8 phr, 9 phr, 10 phr) of whey protein in the rubber composition, including about 0.2 to about 9 phr, including 0.2 to 9 phr, including about 0.25 to about 8 phr, including 0.25 phr to 8 phr, including about 0.3 to about 7 phr, including 0.3 to 7 phr, including about 0.4 to about 6 phr, including 0.4 to 6 phr, including about 0.5 to about 5 phr, and including 0.5 to 5 phr whey protein in the rubber composition. The amount of whey protein component needed to provide the foregoing amounts of whey protein will vary depending upon the concentration of whey protein in the respective whey protein component.

As discussed above, in certain embodiments according to the first-third embodiments disclosed herein, sources for the whey protein component used in the rubber composition (and, accordingly, the whey protein contained in the rubber composition) include manufacturers of acid whey-based dairy products, such as producers of Greek yogurt, cottage cheese, and other soft cheeses. In certain embodiments of the first-third embodiments disclosed herein, sources for the whey protein component used in the rubber composition (and, accordingly, the whey protein contained in the rubber composition) include commercial whey protein products, including but not limited to acid whey powder, sweet whey powder, reduced lactose whey, reduced minerals whey, WPC, WPI, and combinations thereof.

Polymers (Rubbers)

As discussed above, according to the first and second embodiments disclosed herein, the rubber composition comprises at least one of a butyl rubber or a halogenated butyl rubber. In other words, the rubber composition comprises at least one butyl rubber, at least one halogenated butyl rubber, or at least one butyl rubber and at least one halogenated butyl rubber. In certain embodiments of the first-third embodiments disclosed herein, the at least one butyl rubber or a halogenated butyl rubber comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one butyl rubber or halogenated butyl rubber is utilized. Non-limiting examples of suitable polymers for use as the at least one butyl rubber or a halogenated butyl rubber according to certain embodiments of the first-third embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments according to the first-third embodiment disclosed herein, the rubber composition comprises at least one halogenated butyl rubber selected from the group consisting of bromobutyl rubber, chlorobutyl rubber, and combinations thereof.

As discussed above, in certain embodiments according to the first and second embodiments, the rubber composition comprises at least one butyl rubber. Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer. Typically, the diene-based mer (e.g., isoprenyl or para-methylstyrenyl) units are distributed randomly in the polymer chains of butyl rubber.

Generally, various polymerization methods are known for producing butyl rubbers, and it should be understood that the particular method by which the butyl rubber is produced is not limited. Butyl rubber may be polymerized as a solution reaction or a bulk reaction. The polymerization reaction is most commonly a solution reaction using an appropriate low temperature solvent (e.g., methyl chloride) and the reaction is controlled at low temperatures (i.e., about −90° C. to −100° C.) to achieve high molecular weights. In the reactor, a slurry of fine particles of butyl rubber is formed and dispersed in the solvent (e.g., methyl chloride). The solvent and unreacted monomers are flashed and stripped by adding steam and hot water to the reactor. Slurry aids (e.g., zinc stearate or calcium stearate) and antioxidants may be added to the slurry. The particles of butyl rubber are filtered from the slurry and dried into small crumbs, which then may be compressed into bricks, bales, or other solid shapes and packaged in anticipation of further processing.

As discussed above, in certain embodiments according to the first and second embodiments, the rubber composition may comprises a halogenated butyl rubber. Halogenated butyl rubbers that are particularly useful in tire innerliners or innertubes comprise at least about 0.1 wt % of halogen (i.e., chlorine, fluorine, bromine, or iodine), based on the weight of butyl rubber. In certain embodiments according to the first and second embodiments disclosed herein, the halogenated butyl rubber comprises from about 0.1 to about 5 wt % of halogen based on the weight of the butyl rubber, including 0.1 to 5 wt %, including from about 0.5 to about 3 wt %, including from 0.5 to 3 wt %, including from about 1 wt % to about 3 wt %, including from 1 wt % to 3 wt %, including from about 1 wt % to about 2.5 wt %, and including from 1 wt % to 2.5 wt % of halogen based on the weight of butyl rubber.

Halogenated butyl rubber is generally made by halogenating (i.e., substituting halogen atoms for hydrogen atoms) the polymer chains of butyl rubber which has been prepared as described above. The butyl rubber (in the form of crumbs, compressed shapes, or other forms) is dissolved in a suitable solvent (e.g., hexane or pentane) and unreacted monomer is removed. A halogenating agent (e.g., chlorine vapor, fluorine vapor, liquid bromine, or liquid iodine) is added to the butyl rubber solution under agitation. Hydrohalic acid (i.e., hydrochloric acid, hydrofluoric acid, hydrobromic acid, or hydroiodic acid) is released during the halogenation process, and the acid is neutralized with caustic (e.g., sodium hydroxide). The solvent is then flashed and stripped by adding steam and hot water to the reactor, leaving a slurry of halogenated butyl rubber particles. Slurry aids (e.g., zinc stearate or calcium stearate) and antioxidants may be added to the slurry. The particles of halogenated butyl rubber are filtered from the slurry and dried into small crumbs, which then may be compressed into bricks, bales, or other suitable shapes and packaged in anticipation of further processing.

Numerous commercial sources of butyl rubber or halogenated butyl rubber are well-known and suitable for use in the rubber compositions and methods disclosed herein. As non-limiting examples, ExxonMobil Chemical Company (Houston, Tex.) offers various grades of its Exxon™ Butyl, Exxon™ Bromobutyl, and Exxon™ Chlorobutyl rubbers. ExxonMobil also offers various grades of Exxpro™ specialty halogenated butyl rubbers.

In certain embodiments according to the first and second embodiments disclosed herein, the rubber composition may comprise one or more additional rubbers. In certain embodiments where one or more additional rubbers (i.e., in addition to the at least butyl rubber or halogenated butyl rubber) is utilized, it is present in an amount up to about 50 parts or phr. In other words, such rubber compositions comprise at least 50 parts or phr of at least one butyl rubber or halogenated butyl rubber and up to 50 parts or phr of at least one additional rubber. In certain embodiments where one or more additional rubbers (i.e., in addition to the at least butyl rubber or halogenated butyl rubber) is utilized, it is present in an amount of less than 50 parts or phr, such as up to about 40 parts or phr, up to 40 parts or phr, up to about 30 parts or phr, up to 30 parts or phr, up to about 20 parts or phr, up to 20 parts or phr, up to about 10 parts or phr, or up to 10 parts or phr. In other words, such rubber compositions comprise less than 50 parts or phr, such as up to about 40 parts or phr, up to 40 parts or phr, up to about 30 parts or phr, up to 30 parts or phr, up to about 20 parts or phr, up to 20 parts or phr, up to about 10 parts or phr, or up to 10 phr of at least one butyl rubber or halogenated butyl rubber and more than 50 parts or phr, such as at least about 60 parts or phr, at least 60 parts or phr, at least about 70 parts or phr, at least 70 parts or phr, at least about 80 parts or phr, at least 80 parts or phr, at least about 90 parts or phr, or at least 90 phr of at least one additional rubber. In other embodiments where one or more additional rubbers (i.e., in addition to the at least butyl rubber or halogenated butyl rubber) is utilized, it is present in an amount of up to 100 parts or phr, such as up to about 90 parts or phr, up to 90 parts or phr, up to about 80 parts or phr, up to 80 parts or phr, up to about 70 parts or phr, up to 70 parts or phr, up to about 60 parts or phr, or up to 60 phr. In other words, such rubber compositions comprise up to 100 parts or phr, such as up to about 90 parts or phr, up to 90 parts or phr, up to about 80 parts or phr, up to 80 parts or phr, up to about 70 parts or phr, up to 70 parts or phr, up to about 60 parts or phr, or up to 60 phr of at least one butyl rubber or halogenated butyl rubber and more as little as 0 parts or phr, including about up to about 10 parts or phr, up to 10 parts or phr, up to about 20 parts or phr, up to 20 parts or phr, up to about 30 parts or phr, up to 30 parts or phr, up to about 40 parts or phr, or up to 40 phr of at least one additional rubber. Examples of suitable additional rubbers include, but are not limited to, natural rubber, polyisoprene, polybutadiene, styrene-butadiene copolymer rubber, styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof.

Fillers

As discussed above, according to the first and second embodiments disclosed herein and in certain embodiments of the third embodiment, the rubber composition comprises about 5 to about 200 phr of at least one filler. In certain embodiments of the first-third embodiments disclosed herein, the total amount of the filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one filler.

Fillers used for rubber compositions may be categorized as non-reinforcing, semi-reinforcing, or reinforcing. Various definitions exist for each of these categories. Generally, whether a filler is non-reinforcing, semi-reinforcing, or reinforcing depends upon the properties of the filler (e.g., particle size, particle shape, and particle surface area). In certain embodiments of the compositions and methods disclosed herein, the term "non-reinforcing filler" is used to refer to a particulate material that has a nitrogen absorption specific surface area ($N_2SA$) of less than about 20 $m^2/g$, and in certain embodiments less than 20 $m^2/g$, less than about 10 $m^2/g$ or less than 10 $m^2/g$. The $N_2SA$ surface area of a particulate material can be determined according to various standard methods including ASTM D6556. In certain embodiments of the compositions and methods disclosed herein, the term "non-reinforcing filler" is used to refer to a particulate material that has a particle size of greater than about 1000 nm. In certain embodiments of the compositions and methods disclosed herein, the term "reinforcing filler" is used to refer to a particulate material that has a nitrogen absorption specific surface area ($N_2SA$) of more than about 100 $m^2/g$, and in certain embodiments more than 100 $m^2/g$, more than about 125 $m^2/g$, more than 125 $m^2/g$, or even more than about 150 $m^2/g$ or more than 150 $m^2/g$. In certain embodiments of the compositions and methods disclosed herein, the term "reinforcing filler" is used to refer to a particulate material that has a particle size of about 10 nm to about 50 nm (including 10 nm to 50 nm). In certain embodiments of the compositions and methods disclosed herein, the term "semi-reinforcing filler" is used to refer to a filler that is intermediary in either particle size, surface area ($N_2SA$), or both, to the non-reinforcing filler and reinforcing filler.

In certain embodiments, of the first-third embodiments disclosed herein the at least one filler comprises at least one reinforcing filler. In certain embodiments of the first-third embodiments disclosed herein, the filler comprises at least one of: carbon black and silica; in other words, in certain embodiments of the first-third embodiments disclosed herein, the filler comprises at least one carbon black, at least one silica, or at least one carbon black and at least one silica. In certain embodiments, of the first-third embodiments disclosed herein the at least one filler comprises: (1) at least one reinforcing filler, and (2) at least one of: at least one non-reinforcing filler or at least one semi-reinforcing filler.

Suitable reinforcing fillers for use in the rubber composition are well known, with carbon black and silica being the most widely used reinforcing fillers. Non-limiting examples of reinforcing fillers suitable for use in the rubber compositions of certain embodiments of the first-third embodiments disclosed herein include, but are not limited to, carbon black and silica fillers. As discussed in more detail below, other non-limiting examples of fillers suitable for use in the rubber composition of certain embodiments of the first-third embodiments disclosed herein include inorganic mineral fillers such as clay filler, mica, talc, calcium carbonate, and combinations thereof, which are generally classified as non-reinforcing or semi-reinforcing fillers.

In certain embodiments of the first-third embodiments disclosed herein, the rubber composition comprises one or more carbon black fillers (which are generally reinforcing fillers in all but the highest grades such as N900 series). In those embodiments of the first-third embodiments, where the rubber composition includes one or more carbon blacks, the total amount of filler including carbon black is about 5 to about 200 phr (including 5 to 200 phr). Generally, suitable carbon black for use in the rubber composition of certain embodiments of the first-third embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ (including at least 35 $m^2/g$ up to 200 $m^2/g$) or higher. Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the rubber composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

In certain embodiments of the first-third embodiments disclosed herein, the rubber composition comprises one or more silica fillers (which are generally reinforcing or semi-reinforcing fillers, especially fumed silicas, precipitated silicas and precipitated silicates). In those embodiments of the first-third embodiments, where the rubber composition includes one or more silica fillers, the total amount of filler including silica is about 5 to about 200 phr. Generally, suitable silica filler for use in the rubber composition of certain embodiments of the first-third embodiments disclosed herein includes any of the commonly available, commercially-produced silicas, including but not limited to precipitated amorphous silica, wet silica (hydrated silicic acid), dry silica (anhydrous silicic acid), fumed silica, calcium silicate and the like. Other suitable silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such reinforcing or semi-reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the rubber composition comprises a reinforcing or semi-reinforcing silica filler having a surface area (as measured by the BET method) of about 32 $m^2/g$ to about 400 $m^2/g$ (including 32 $m^2/g$ to about 400 $m^2/g$), with the range of about 100 $m^2/g$ to about 300 $m^2/g$ (including 100 $m^2/g$ to about 300 $m^2/g$) being preferred, and the range of about 150 $m^2/g$ to about 220 $m^2/g$ (including 150 $m^2/g$ to about 220 $m^2/g$) being included. In certain embodiments of the first-third embodiments disclosed herein, the rubber composition comprises reinforcing or semi-reinforcing silica filler having a pH of about 5.5 to about 7 (including 5.5 to 7) or slightly over 7, preferably about 5.5 to about 6.8 (including 5.5 to 6.8). Some of the commercially available silica fillers which can be used in the rubber compositions of certain embodiments of the first-third embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing and semi-reinforcing silica fillers are also available from Degussa Corporation (e.g., VN2, VN3), Rhone Poulenc (e.g., Zeosil™ 1165 MP), and J. M. Huber Corporation. In certain embodiments of the first-third embodiments disclosed herein, as discussed in more detail below, the reinforcing silica filler comprises a silica that has been pre-treated with a silica coupling agent; preferably the pre-treated silica comprises a silica that has been pre-treated with a silane-containing silica coupling agent.

In certain embodiments of the first-third embodiments disclosed herein, the rubber composition further comprises one or more inorganic mineral fillers selected from at least one of clay filler, mica, talc, and calcium carbonate. In those embodiments of the first-third embodiments where the filler comprises one or more inorganic mineral fillers from the foregoing group, the amount of inorganic mineral filler selected from at least one of clay filler, mica, talc, and calcium carbonate is about 2 to about 200 phr (including 2 to 200 phr, about 2 to about 100 phr, and 2 to 100 phr). Generally, suitable inorganic mineral fillers for use in the rubber composition of certain embodiments of the first-third embodiments disclosed herein includes any of the commonly available, commercially-produced inorganic mineral fillers. In certain embodiments of the first-third embodiments disclosed herein, a filler comprises inorganic mineral filler which comprises clay filler. Useful clay fillers include smectite or smectite-type clays, which refer to the general class of clay minerals with expanding crystal lattices. For example, useful clay fillers include smectite clays such as montmorillonite, nontronite, saponite, hectorite, sauconite, and the like. Other useful clay fillers include bentonite, laponite, magadite, kenyaite, vermiculite, kaolinite, halloysite, aluminate oxides, hydrotalcite, and the like. Layered clays may be modified, such as being intercalated or exfoliated by treatment with modifying agents (i.e., swelling agents or exfoliating agents). Non-limiting examples of commercially available clay fillers suitable for use in certain embodiments of the first-third embodiments include CLOISITE™ produced by BYK Additives, Inc. (formerly Southern Clay Products, Inc.), Gonzales, Tex., and LUCENTITE™ clay products produced by CO-OP Chemical Company, Ltd, Tokyo, Japan.

In certain embodiments of the first-third embodiments, the rubber composition further comprises at least one additional filler in addition to the fillers discussed above (i.e., in addition to the carbon blacks, silica and silicates, and inorganic mineral fillers selected from clay, mica, talc and calcium carbonate, discussed above). Non-limiting examples of suitable additional fillers for use in the rubber compositions of certain embodiments of the first-third embodiments disclosed herein include, but are not limited to, aluminum hydroxide, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_34SiO_2.H_2O$), boron nitride, glass balloon, glass beads, calcium oxide (CaO), calcium hydroxide ($Ca(OH)_2$), magnesium hydroxide ($Mg(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

In certain embodiments of the first-third embodiments disclosed herein, the about 5 to about 200 phr of at least one filler includes cellulose ester. Cellulose ester is a compound based upon cellulose (cellulose is a polysaccharide having the formula $C_6H_{10}O_5$ and consists of a linear chain of hundreds to thousands of 1,4-linked D-glucose units). Cellulose esters are produced by converting (esterifying) —OH groups in cellulose to an ester. The hydrocarbon groups used to esterify cellulose can vary widely; in certain embodiments, the R portion of the alkanoyl group (i.e., —C(=O)R) used to esterify comprises an alkyl group having 1-10 carbons; in certain embodiments more than one type of ester group is used to esterify, thereby producing a cellulose ester with more than one type of alkanoyl group. In certain embodiments of the first-third embodiments, the rubber composition comprises at least one cellulose ester selected from cellulose acetate, cellulose acetate propionate, cellulose acetate butyrate, cellulose acetate triacetate, cellulose tripropionate, or cellulose tributyrate. According to the first-third embodiments disclosed herein, the rubber composition can comprise one or more than one cellulose ester. The cellulose ester that is utilized in the rubber compositions of certain embodiments of the first-third embodiments generally comprises a cellulose ester. Various commercially available cellulose esters exist, including those in powder, pellet, or fiber form. Exemplary cellulose esters suitable for use in the rubber compositions of the first-third embodiments disclosed herein include those available from Eastman Chemical Company (Kingsport, Tenn.) such as cellulose acetate, cellulose acetate butyrate, and cellulose acetate propionate. In certain embodiments of the first-third embodiments disclosed herein, the cellulose ester comprises cellulose acetate. In certain embodiments of the first-third embodiments disclosed herein, the cellulose ester comprises cellulose acetate butyrate. In certain embodiments of the embodiments of the first-third embodiments disclosed herein, the cellulose ester comprises cellulose acetate propionate. In certain embodiments of the first-third embodiments disclosed herein, the cellulose ester comprises cellulose acetate, cellulose acetate butyrate, cellulose acetate propionate, or a combination thereof. Cellulose esters can be classified by various properties including the percentage of acetylation (the converse of which is the percentage of —OH groups remaining), melting range, Tg, and Mn. In certain embodiments of the first-third embodiments, the cellulose ester comprises cellulose acetate having at least one of the following properties: 3-4% —OH groups, melting range of 230-250° C., Tg of 180-190° C., or Mn of 30,000-50,000 grams/mole (number average molecular weight in polystyrene equivalents determined using size exclusion chromatography). In certain embodiments of the first-third embodiments, the cellulose ester comprises cellulose acetate butyrate having at least one of the following properties: 1-5% —OH groups, melting range of 120-250° C., Tg of 80-170° C., or Mn of 10,000 to 75,000. In certain embodiments of the first-third embodiments, the cellulose ester comprises cellulose acetate propionate having at least one of the following properties: 1.5-5% —OH groups, melting range of 180-210° C., Tg of 140-160° C., and Mn of 15,000-75,000. In certain embodiments of the first-third embodiments disclosed herein, the rubber composition comprises cellulose ester in an amount of about 1 to about 100 phr (e.g., 1 phr, 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, 100 phr), including 1 to 100 phr, about 1 to about 75 phr, 1 to 75 phr, about 5 to about 75 phr, 5 to 75 phr, about 1 to about 30 phr, 1 to 30 phr, about 5 to about 30 phr, and 5 to 30 phr phr. In certain embodiments of the first-third embodiments disclosed herein, the rubber composition comprises cellulose ester in one of the foregoing amounts and the total amount of silica and/or carbon black filler and cellulose ester comprises about 5 to about 200 phr, including 5 to 200 phr. In certain embodiments of the first-third embodiments disclosed herein, the rubber composition comprises cellulose ester in one of the foregoing amounts, silica filler and/or carbon black filler, and at least one additional reinforcing or non-reinforcing filler. Rubber compositions according to the first-third embodiments disclosed herein which include cellulose ester can be prepared according to various processes as discussed herein; generally according to such processes the whey protein and the cellulose ester will both be added during a masterbatch stage. In certain embodiments, a rubber composition according to the first-third embodiments disclosed herein which includes cellulose ester is prepared by adding the whey protein and the cellulose ester during the same masterbatch stage; in certain such embodiments, the whey protein and the cellulose ester are added during a second masterbatch stage and in other embodiments, the whey protein and the cellulose ester are added during a first masterbatch stage. In other embodiments, a rubber composition according to the first-third embodiments disclosed herein which includes cellulose ester is prepared by adding the whey protein and the cellulose ester during different masterbatch stages; in certain such embodiments, the whey protein is added before the cellulose ester (e.g., whey protein during a first masterbatch stage and cellulose ester during a second masterbatch stage) and in other embodiments, the whey protein is added after the cellulose ester (e.g., cellulose ester during a first masterbatch stage and whey protein during a second masterbatch stage). Alternatively, in certain embodiments of the first-third embodiments which includes cellulose ester, at least one of the whey protein and cellulose ester is added during more than one masterbatch stage.

Silica Coupling Agents

As discussed above, in certain embodiments of the first-third embodiments disclosed herein, the rubber composition includes one or more silica coupling agents. Silica coupling agents are useful in preventing or reducing aggregation of the silica filler in the rubber composition. Aggregates of the silica filler particles are believed to increase the viscosity of the rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in the rubber compositions of certain exemplary embodiments according to the first-third embodiments disclosed herein include, but are not limited to, octyltriethoxysilane, octyltrimethoxysilane, trimethylethoxysilane, cyclohexyltriethoxysilane, is obutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in the rubber compositions of certain exemplary embodiments according to the first-third embodiments disclosed herein include bis(trialkoxysilylorgano)disulfides and bis(trialkoxysilylorgano)tetrasulfides. Specific non-limiting examples of bis(trialkoxysilylorgano)disulfides suitable for use in the rubber compositions of certain exemplary embodiments according to the first-third embodiments disclosed herein include, but are not limited to, 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in the rubber compositions of certain exemplary embodiments according to the first-third embodiments disclosed herein include, but are not limited to, bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in the rubber compositions of certain exemplary embodiments of the first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in the rubber compositions of certain exemplary embodiments according to the first-third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthio acetate; 2-trimethoxysilyl-1-ethylthio acetate; 2-(methyldimethoxysilyl)-1-ethylthio acetate; 3-trimethoxysilyl-1-prop ylthio acetate; triethoxysilylmethyl-thio acetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthio acetate, 2-(methyldiisopropoxysilyl)-1-ethylthioacetate; 2-(dimethylethoxysilyl-1-ethylthio acetate; 2-(dimethylmethoxysilyl)-1-ethylthioacetate; 2-(dimethylisopropoxysilyl)-1-ethylthio acetate; 3-triethoxysilyl-1-prop ylthio acetate; 3-triisopropoxysilyl-1-prop ylthio acetate; 3-methyldiethoxysilyl-1-propyl-thio acetate; 3-methyldimethoxysilyl-1-propylthioacetate; 3-methyldiisopropoxysilyl-1-prop ylthio acetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in the rubber compositions of certain exemplary embodiments according to the first-third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl)polysulfide (Si69) and Ultrasil® VN3 silica. Coupsil 6508, Agilon 400™ silica from PPG Industries, Agilon 454® silica from PPG Industries, and Agilon 458® silica from PPG Industries. In those embodiments of the rubber compositions and methods disclosed herein where the silica comprises a pre-treated silica, the pre-treated silica is used in an amount as previously disclosed for the reinforcing silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr.

The amount of silica coupling agent used in the rubber compositions according to the first-third embodiments disclosed herein may vary. In certain embodiments of the first-third embodiments disclosed herein, the rubber compositions do not contain any silica coupling agent. In other embodiments of the first-third embodiments disclosed herein, the silica coupling agent is present in an amount sufficient to provide a ratio of the total amount of silica coupling agent to reinforcing silica filler of about 1:100 to about 1:5 (i.e., about 0.01 to about 20 parts by weight per 100 parts of silica), including 1:00 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Other Components of Rubber Composition

In certain embodiments of the first-third embodiments, the rubber composition further comprises a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other ingredients that may be employed in the rubber compositions of certain embodiments of the first-third embodiments disclosed herein are well known to those of skill in the art and include oils (processing and extender), waxes, processing aids, antioxidants, tackifying resins, reinforcing resins, peptizers, and one or more additional rubbers.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000 L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, for most applications the total amount of oil used (both processing oil and extender oil) in the rubber compositions and methods disclosed herein ranges from about 1 to about 40 phr, 1 to 40 phr, about 1 to about 30 phr, 1 to 30 phr, about 5 to about 30 phr, and 5 to 30 phr.

Various antioxidants are known to those of skill in the art and may be utilized in the rubber compositions of certain embodiments of the first-fourth embodiments; these include but are not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first-third embodiments. In certain embodiments of the first-third embodiments, the total amount of antioxidant(s) used is 0.1 to 6 phr Improving Green Strength and/or Air Permeability of Rubber Composition Green strength is a term used in the tire industry to refer to the strength, cohesiveness, and dimensional stability of a vulcanizable rubber composition while the rubber composition is still in an unvulcanized or uncured state. Green strength may be evaluated by quantifying certain tensile properties (e.g., measuring the stress-strain behavior while a rubber sample is stretched) of the unvulcanized or uncured rubber composition. When a rubber composition is used in or for use in a tire innerliner or innertube, higher measured values for tensile properties associated with green strength are preferred. Generally, higher green strength results in improved strength, cohesiveness, and dimensional stability of the rubber composition and the tire component (i.e., the tire innerliner or innertube).

Air permeability is a term used in the tire industry to refer to the ability of a rubber composition or tire component to resist the diffusion of air through the rubber composition. Air permeability is evaluated by measuring the diffusion of air through a sample of a rubber composition, using an instrument such as a Oxtran® permeation instrument from MOCON, Inc., Minneapolis, Minn. When a rubber composition is used in or for use in a tire innerliner or innertube, lower measured values for air permeability are preferred.

As discussed above, the third embodiment disclosed herein is a method for improving at least one of green strength and air permeability of a vulcanized rubber composition used in a tire innerliner or innertube by incorporating about 0.1 to about 10 phr of whey protein into the rubber composition that is used in the innerliner or innertube. In other words, according to the methods of the third embodiments, green strength, air permeability, or both are improved in a rubber composition by the addition of whey protein. The improvement in green strength, air permeability, or both, is as compared to a rubber composition comprising the same ingredients except lacking any whey protein (i.e., having 0 phr of whey protein). As used herein, the phrase "improvement in green strength" (or improved green strength) refers to an improvement of at least 5% in at least one of the following green strength properties: peak tensile stress ($T_p$), tensile stress at break ($T_b$), tensile stress at 600% elongation (M600), % strain at peak tensile stress ($\varepsilon_p$), and energy at 600% strain (E600). In certain embodiments, the improvement in green strength comprises an improvement of at least 10% in at least one of the foregoing green strength properties. As used herein, the phrase "improvement in air permeability" (or improved air permeability) refers to an improvement of at least 5% in at least one of the following air permeability properties: air transmission rate (TR), permeability rate (perm. Rate), and diffusivity coefficient. In certain embodiments, the improvement in air permeability comprises an improvement of at least 10% in at least one of the foregoing air permeability properties.

In certain embodiments of the third embodiment disclosed herein, the method comprises incorporating at least one of a butyl rubber or a halogenated butyl rubber and at least one reinforcing filler in an amount of about 10 to about 200 phr (including 10 to 200 phr) in the rubber composition. In certain embodiments of the third embodiment disclosed herein, the rubber composition comprises bromobutyl rubber, chlorobutyl rubber, or combinations thereof. In certain embodiments of the third embodiment disclosed herein, the filler comprises a reinforcing filler comprising at least one of carbon black and silica. In certain embodiments of the third embodiment disclosed herein, the whey protein meets at least one of the following: a majority of the protein chains in the whey protein have a molecular weight of greater than about 10 kDaltons; a majority of the proteins in the whey protein are a combination of alpha-lactalbumin and beta-lactoglobulin; and the whey protein has a DH of less than 50%, preferably less than 5%. In certain embodiments of the third embodiment disclosed herein, rubber composition further comprises about 2 to about 200 phr of at least one of clay filler, mica, talc, and calcium carbonate. Generally, it should be understood that the rubber compositions formed according to the methods of the third embodiment disclosed herein, may contains in certain embodiments any of the ingredients (e.g., rubbers, fillers, and other components) in the combinations and amounts discussed in detail above with respect to the rubber compositions of the first and second embodiments disclosed herein.

The improvement in green strength, air permeability, or both from the use of whey protein should also be understood to occur in the rubber compositions of the first and second embodiments disclosed herein. The improvement in green strength, air permeability, or both from the use of whey protein should also be understood to occur in rubber compositions resulting from the methods of the third embodiment disclosed herein.

Methods for Preparing Rubber Compositions

Also disclosed herein are methods for preparing rubber compositions. The rubber compositions according to the first-third embodiments disclosed herein may generally be formed by mixing together the ingredients for the rubber composition (as disclosed above) by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. In certain embodiments of the compositions and methods disclosed herein, more than one non-productive master-batch mixing stage may be used. The term final productive mixing stage is also known to those of skill in the art and generally understood to be the mixing stage where the vulcanizing agents and vulcanization accelerators are added into the rubber composition.

In certain embodiments of the methods for preparing rubber compositions according to the first-third embodiments disclosed herein, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

In certain embodiments of the first-third embodiments disclosed herein, a rubber composition is prepared according to a method that includes at least one non-productive mixing stage and at least one productive mixture stage. In certain embodiments, the method for preparing the rubber compositions of the present disclosure includes: (1) mixing, in at least one non-productive master-batch stage, a rubber composition comprising: 100 phr of at least one of a butyl rubber or a halogenated butyl rubber; from about 5 to about 200 phr of filler (including 5 to 200 phr of filler); and a whey protein component (or a source of whey protein) in an amount sufficient to provide about 0.1 to about 10 phr (including 0.1 to 10 phr) whey protein; and (2) mixing the resulting product of the non-productive master batch in a final productive stage along with at least one curative, such as a curative package, as discussed above. With respect to certain embodiments of the first embodiment disclosed herein, the list of ingredients should be understood as including ingredients to be mixed to form the rubber composition. Accordingly, in such embodiments, the whey protein is added via a whey protein component which usually is not 100% whey protein. With respect to the certain embodiments of the second embodiment disclosed herein (i.e., a rubber composition that has been subjected to curing), the list of ingredients should be understood to comprise the ingredients present in the cured rubber composition such that the amount of whey protein can be measured without regard to its particular source (e.g., without regard to the particular whey protein component used to provide the whey protein).

In certain embodiments of the first-third embodiments disclosed herein, a rubber composition is prepared according to a method that includes at least one non-productive mixing stage and at least one productive mixing stage. In certain embodiments of the first-third embodiments disclosed herein, the method for preparing the rubber compositions of the present disclosure includes: (1) mixing, in at least one non-productive master-batch stage, a rubber composition comprising: 100 phr of at least one of a butyl rubber or a halogenated butyl rubber; from about 5 to about 200 phr (including 5 to 200 phr) of at least one filler; a whey protein component in an amount sufficient to provide about 0.1 to about 10 phr (including 0.1 to 10 phr) whey protein; and about 2 to about 200 phr (including 2 to 200 phr) of at least one of clay filler, mica, talc, and calcium carbonate; and (2) mixing the resulting product of the non-productive master batch in a final productive stage along with at least one curative, such as a cure package, as discussed above. With respect to certain embodiments of the first embodiment disclosed herein, the list of ingredients should be understood as including ingredients to be mixed to form the rubber composition. Accordingly, in such embodiments, the whey protein is added via a whey protein component which usually is not 100% whey protein. With respect to the certain embodiments of the second embodiment disclosed herein (i.e., a rubber composition that has been subjected to curing), the list of ingredients should be understood to comprise the ingredients present in the cured rubber composition such that the amount of whey protein can be measured without regard to its particular source (e.g., without regard to the particular whey protein component used to provide the whey protein).

As previously discussed, certain embodiments disclosed herein include tires innerliners or innertubes comprising a rubber composition of the first-second embodiments as otherwise disclosed herein, i.e., comprising at least one of a butyl rubber or a halogenated butyl rubber, about 5 to about 200 phr (including 5 to 200 phr) of at least one filler, and a whey protein component in an amount sufficient to provide about 0.1 to about 10 phr (including 0.1 to 10 phr) whey protein (or when referring to a cured rubber composition, about 0.1 to about 10 phr (including 0.1 to 10 phr) of whey protein. More specifically, the present disclosure includes a tire comprising a tire innerliner or innertube comprising a rubber composition of the first-second embodiments as otherwise disclosed herein. Generally, when the rubber compositions of the first-second embodiments disclosed herein are utilized in tires, tire innerliners or innertubes, these compositions are processed into tire components according to ordinary tire manufacturing techniques including standard rubber shaping, molding, and curing techniques.

Typically, vulcanization of a tire component is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In certain embodiments, pneumatic tires containing the rubber compositions as disclosed herein can be produced as discussed in U.S. Pat. Nos. 5,866,171, 5,876,527, 5,931,211, and 5,971,046, which are incorporated herein by reference.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the whey protein utilized in the examples (both type and amount) can be utilized with rubbers, fillers, and other ingredients which differ in amount, composition, or both from those used in the examples (i.e., as fully disclosed in the preceding paragraphs). Moreover, whey protein can be utilized in amounts and from sources that differ from those provided in the examples (i.e., as fully disclosed in the preceding paragraphs).

Examples 1-6

In Examples 1-6, rubber compositions containing halogenated butyl rubber, carbon black, and clay filler were prepared using varying amounts of whey protein. Table 1 lists the formulas for the rubber compositions. Example 1, containing no whey protein, was the formula of the base rubber composition against which the other rubber compositions were compared (i.e., the control). For Example 2, a portion of the clay filler was substituted with an equivalent amount of whey protein in the formula of Example 1. For Examples 4 and 6, whey protein was added but the amount of clay filler was the same as the formula of Example 1. For Examples 3 and 5, additional amounts of clay filler were added, but no whey protein. The rubber compositions were prepared in a two stage mixing process according to the formulations shown in Table 1. The amount of each ingredient used is reported as parts per hundred rubber (phr). The mixing processes used for these formulations are outlined in Table 2. The whey protein component utilized in Examples 2, 4 and 6 was acid whey (containing approximately 12 weight % protein).

Before curing, each of the rubber compositions was tested for green strength tensile properties. The testing results for the formulations of Table 1 are shown in Table 3, below. The indexed values appearing in Tables 3 and 4 were prepared by dividing the experimental value by the respective value of the control. For testing, straight-sided specimens of the uncured rubber compositions measuring 12.5 mm wide and 0.5 mm thick were stretched by a tensile tester and the peak stress and tensile tress was recorded. The abbreviation $T_p$ is used for peak tensile stress and $T_b$ is used for tensile stress at break. The abbreviation M600 is used for tensile stress at 600% elongation. The abbreviation $\varepsilon_p$ is used for the % strain at peak tensile stress. The abbreviation E600 is used for the energy at 600% strain.

After curing, each of the rubber compositions was tested for air permeability properties. The testing results for the formulations of Table 1 are shown in Table 4, below. The abbreviation TR is used for air transmission rate, which measures the volume of air that passes through a given area (e.g., the area in square meters) of rubber composition per day. The permeability rate (perm. rate) measures the volume of air that passes through a given thickness (e.g., mm or mil) of rubber composition per day, and the units are (cc×mil)/(m²×day×atm) or (cc×mm)/(m²×day×atm), with 1 mm=39.37 mils. The diffusivity coefficient is calculated based upon the permeability rate and using a solubility coefficient. For the Examples discussed herein, the diffusivity coefficient was calculated by multiplying the permeability rate times a solubility coefficient of 0.116.

The specimens used for Mocon testing had dimensions of 133 mm×133 mm×0.5 mm. No pre-conditioning was performed prior to testing. The oxygen permeation measurements were measured using a Mocon® (Mocon Inc., Minneapolis, Minn.) permeability tester at a test temperature of 60° C. under the principle of R. A. Pasternak et al. in 8 JOURNAL OF POLYMER SCIENCE: PART A-2 467 (1970) and following the guidance of (but not strictly according to) ASTM D-3895. 30 psi of air pressure was used during the testing.

TABLE 1

Formulations for Example Rubber Compositions

| | Example # | | | | | |
|---|---|---|---|---|---|---|
| | 1 (Base Formulation) | 2 (+5 phr whey, −5 phr clay) | 3 (+5 phr clay) | 4 (+5 phr whey) | 5 (+10 phr clay) | 6 (+10 phr whey) |
| Master-Batch | | | | | | |
| Halogenated butyl rubber[1] | 100 | 100 | 100 | 100 | 100 | 100 |
| Carbon Black | 48 | 48 | 48 | 48 | 48 | 48 |
| Processing Oil | 2 | 2 | 2 | 2 | 2 | 2 |
| Phenolic Resins | 4 | 4 | 4 | 4 | 4 | 4 |
| Whey protein component (acid whey) | 0 | 5 | 0 | 0 | 0 | 10 |
| Whey protein (from WPC) | 0 | 0.6 | 0 | 0.6 | 0 | 1.2 |
| Clay filler | 25 | 20 | 30 | 25 | 35 | 25 |
| Accelerator | 1.2 | 1.2 | 1.2 | 1.2 | 1.2 | 1.2 |
| Stearic acid | 1.5 | 1.5 | 1.5 | 1.5 | 1.5 | 1.5 |
| Final Batch | | | | | | |
| Vulcanization activator (Zinc oxide) | 3 | 3 | 1.2 | 3 | 1.2 | 3 |
| Vulcanizing agent (sulfur) | 0.2 | 0.2 | 1.5 | 0.2 | 1.5 | 0.2 |

[1]Bromobutyl rubber

TABLE 2

Mixing Parameters for Example Compositions

| Stage | Time | Condition |
|---|---|---|
| Master-Batch Stage (initial temp: 105° C., rotor rpm started at 60) | 0 seconds | Charge polymers |
| | 30 seconds | Charge any oil, filler (e.g., any carbon black) and other master-batch ingredients. Increase rotor to 75 rpm |
| | | Drop based on max temperature of 330° F. (166° C.) |
| Final Batch Stage (initial temp: 80° C., rotor rpm at 40) | 0 seconds | Charge Remill |
| | 0 seconds | Charge curatives |
| | | Drop based on max temperature of 210° F. (99° C.) |

TABLE 3

Green Strength Test Results

| Property | 1 (Base Formulation) | 2* (+5 phr WPC, −5 phr clay) | 3 (+5 phr clay) | 4* (+5 phr WPC) | 5 (+10 phr clay) | 6* (+10 phr WPC) |
|---|---|---|---|---|---|---|
| Indexed $T_p$ | 1.00 | 1.02 | 1.04 | 1.08 | 1.10 | 1.05 |
| Indexed $T_b$ | 1.00 | 1.29 | 0.89 | 1.45 | 1.28 | 1.78 |
| Indexed M600 (PSI) | 1.00 | 1.29 | 0.90 | 1.46 | 1.28 | 1.79 |
| Indexed $\varepsilon_p$ | 1.00 | 1.14 | 0.89 | 1.19 | 0.98 | 1.16 |
| Indexed E600 | 1.00 | 1.12 | 0.97 | 1.18 | 1.15 | 1.32 |

*denotes an example according to the present disclosure

TABLE 4

Air Permeability Test Results

| Property | 1 (Base Formulation) | 2* (+5 phr WPC, −5 phr clay) | 3 (+5 phr clay) | 4* (+5 phr WPC) | 5 (+10 phr clay) | 6* (+10 phr WPC) |
|---|---|---|---|---|---|---|
| Indexed TR | 1.00 | 1.00 | 0.99 | 1.00 | 0.95 | 0.87 |
| Indexed Perm Rate | 1.00 | 1.00 | 0.97 | 1.00 | 0.95 | 0.88 |
| Indexed Perm Rate | 1.00 | 1.00 | 0.97 | 0.95 | 0.93 | 0.89 |
| Indexed Diffusivity Coefficient | 1.00 | 1.00 | 0.97 | 0.95 | 0.93 | 0.89 |

Green strength improvements are illustrated as the percent increase in each green strength-related tensile property (from Table 3) over the base formulation of Example 1) for the compositions of Examples 2, 4 and 6 in the graph in FIG. 1. Surprisingly as whey protein is added to the rubber compositions, the green strength-related tensile properties improve for the rubber compositions (i.e., Examples 2, 4 and 6). When 5 phr of whey protein component (0.6 phr of whey protein) replaces 5 phr of clay filler (Example 2), the tensile properties improve by about 2% up to about 30% compared to the base formulation of Example 1. At a whey protein component concentration of 5 phr (0.6 phr of whey protein) and no reduction in clay filler (Example 4), the tensile properties improve by almost 10% up to almost 50% compared to the base formulation of Example 1. At a whey protein component concentration of 10 phr (1.2 phr of whey protein) and no reduction in clay filler (Example 6), the tensile properties improve by about 5% up to about 80% compared to the base formulation of Example 1.

Figure 2:
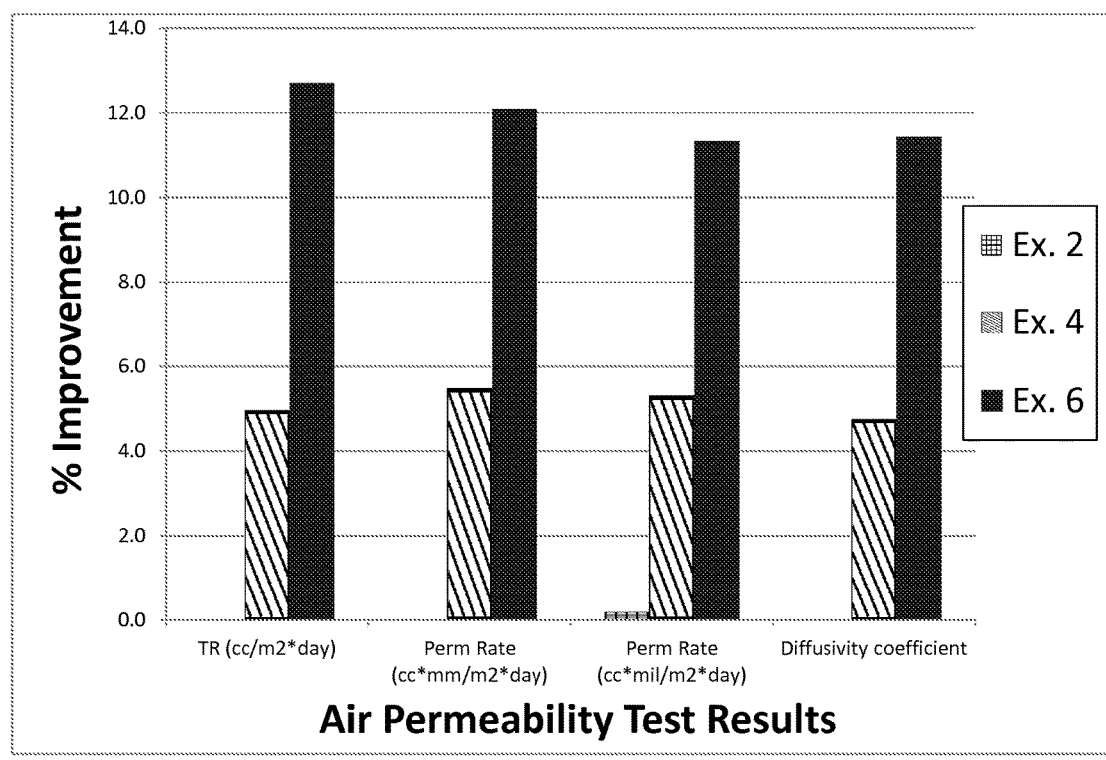
FIG. 2 is a graph showing the percentage improvement in air permeability properties for rubber compositions containing whey protein.

Air permeability improvements are illustrated as the percent decrease in each permeability-related property (from Table 4) over the base formulation of Examples 1) for the compositions of Examples 2, 4 and 6 in the graph in FIG. 2. Lower air permeability properties result in reduced loss of air through the rubber composition when it is used as a tire innerliner or innertube and in improved air retention and air pressure within the tire. Surprisingly as whey protein is added to the rubber compositions, the air permeability properties improve for the rubber composition. When 5 phr of whey protein component (0.6 phr whey protein) replaces 5 phr of clay filler (Example 2), the air permeability properties are similar to the base formulation of Example 1. At a whey protein component concentration of 5 phr (0.6 phr whey protein) and no reduction in clay filler (Example 4), the air permeability properties improve by about 4 to about 6% compared to the base formulation of Example 1. At a whey protein component concentration of 10 phr (1.2 phr whey protein) and no reduction in clay filler (i.e., Example 6), the air permeability properties improve by about 11 to about 13% compared to the base formulation of Example 1.

Examples 7-10

In Examples 7-10, rubber compositions containing halogenated butyl rubber, carbon black filler were prepared using varying amounts of whey protein and cellulose ester. Table 5 lists the formulas for the rubber compositions. Example 7, containing no whey protein or cellulose ester, was the formula of the base rubber composition against which the rubber compositions 7-10 were compared (i.e., the control). For Examples 9 and 10, 10 phr of whey protein was added. For Examples 8 and 10, 5 phr of a portion of cellulose ester was added. Thus, Example 10 contained both cellulose ester and whey protein. The rubber compositions were prepared in a two stage mixing process according to the formulations shown in Table 2. The amount of each ingredient used is reported in Table 5 as parts per hundred rubber (phr). The whey protein component utilized in Examples 9 and 10 was acid whey (containing approximately 12 weight % protein).

TABLE 5

Formulations for Example Rubber Compositions

| | Example # | | | |
|---|---|---|---|---|
| | 7 (Base Formulation) | 8 (+5 phr CE) | 9 (+10 phr whey) | 10 (+10 phr whey & 5 phr CE) |
| Master-Batch | | | | |
| Halogenated butyl rubber[1] | 100 | 100 | 100 | 100 |
| Carbon Black | 70 | 70 | 70 | 70 |
| Processing Oil | 0.15 | 0.15 | 0.15 | 0.15 |
| Phenolic Resins | 14 | 14 | 14 | 14 |
| Whey protein component (acid whey) | 0 | 0 | 10 | 10 |
| Whey protein (from WPC) | 0 | 0 | 1.2 | 1.2 |
| Cellulose ester[2] | 0 | 5 | 0 | 5 |
| Stearic acid | 2 | 2 | 2 | 2 |
| Final Batch | | | | |
| Vulcanization activator (Zinc oxide) | 3 | 3 | 3 | 3 |
| Accelerator | 1.3 | 1.3 | 1.3 | 1.3 |
| Vulcanizing agent (sulfur) | 0.5 | 0.5 | 0.5 | 0.5 |

[1]Bromobutyl rubber
[2]Cellulose acetate butyrate from Eastman™ Chemical Company (product number CAB 381).

Before curing, each of the rubber compositions was tested for green strength according to the procedure described above for Examples 1-6. The testing results for the formulations of Table 5 are shown in Table 6, below. The indexed values appearing in Tables 6 and 7 were prepared by dividing the experimental value by the respective value of the control.

After curing, each of the rubber compositions was tested for air permeability according to the procedure described above for Examples 1-6. The testing results for the formulations of Table 5 are shown in Table 6, below.

TABLE 5

Green Strength Test Results

| Property | 7 (Base Formulation) | 8 (+5 phr CE) | 9 (+10 phr whey) | 10 (+10 phr whey & 5 phr CE) |
|---|---|---|---|---|
| Indexed $T_p$ | 1.00 | 1.03 | 1.03 | 1.10 |
| Indexed $T_b$ | 1.00 | 0.94 | 1.08 | 1.44 |
| Indexed M600 (PSI) | 1.00 | 0.93 | 1.08 | 1.44 |
| Indexed $\varepsilon_p$ | 1.00 | 0.98 | 0.92 | 0.90 |
| Indexed E600 | 1.00 | 0.99 | 1.09 | 1.14 |

TABLE 6

Air Permeability Test Results

| Property | 7 (Base Formulation) | 8 (+5 phr CE) | 9 (+10 phr whey) | 10 (+10 phr whey & 5 phr CE) |
|---|---|---|---|---|
| Indexed TR | 1.00 | 0.84 | 0.90 | 0.96 |
| Indexed Perm Rate | 1.00 | 0.87 | 0.92 | 0.98 |
| Indexed Perm Rate | 1.00 | 0.87 | 0.92 | 0.98 |
| Indexed Diffusivity Coefficient | 1.00 | 0.87 | 0.91 | 0.98 |

As can be seen from the data of Tables 5 and 6, the use of cellulose ester alone in Example 8 (i.e., without any whey protein) led to a small reduction in green strength as compared to control Example 7. The use of whey protein alone (i.e., without any cellulose ester) in Example 9 led to an increase in green strength as compared to Example 8 (similar to the trend shown in Table 3). Surprisingly, the combination of cellulose ester and whey protein in Example 10 led to a significant increase in green strength as compared to control Example 7 (and also as compared to Examples 8 and 9). The use of cellulose ester alone in Example 8 (i.e., without any whey protein) led to a beneficial decrease in the diffusivity coefficient. The use of whey protein alone (i.e., without any cellulose ester) in Example 9 also led to a beneficial decrease in the diffusivity coefficient (similar to the trend shown in Table 4). Surprisingly, the combination of cellulose ester and whey protein together in Example 10 reduced the decrease in the diffusivity coefficient.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition comprising:
   a. at least one of a butyl rubber or a halogenated butyl rubber;
   b. at least one filler in an amount of about 5 to about 200 phr; and
   c. a whey protein component in an amount sufficient to provide about 0.1 to about 10 phr whey protein, wherein the whey protein meets all of the following:
   d. a majority of the protein chains in the whey protein have a molecular weight of greater than about 10 kDaltons;
   e. a majority of the proteins in the whey protein are a combination of alpha-lactalbumin and beta-lactoglobulin; and
   f. a degree of hydrolysis of less than 50%.

2. The rubber composition of claim 1, wherein the whey protein component is in an amount sufficient to provide about 0.5 to about 5 phr whey protein.

3. The rubber composition of claim 1, wherein the whey protein component comprises at least one of acid whey powder, reduced lactose whey, reduced minerals whey, sweet whey powder, whey protein concentrate, and whey protein isolate.

4. A rubber composition that has been subjected to curing, the rubber composition comprising:
   a. at least one of a butyl rubber or a halogenated butyl rubber;
   b. at least one filler in an amount of about 5 to about 200 phr;
   c. whey protein in an amount of about 0.1 to about 10 phr; and
   d. a cure package,
   wherein the whey protein meets all of the following:
   e. a majority of the protein chains in the whey protein have a molecular weight of greater than about 10 kDaltons;
   f. a majority of the proteins in the whey protein are a combination of alpha-lactalbumin and beta-lactoglobulin; and
   g. a degree of hydrolysis of less than 50%.

5. The rubber composition of claim 4, wherein the amount of whey protein comprises about 0.5 to about 5 phr.

6. The rubber composition according to claim 1, comprising at least one halogenated butyl rubber selected from the group consisting of bromobutyl rubber, chlorobutyl rubber, and combinations thereof.

7. The rubber composition according to claim 1, wherein the filler comprises at least one of clay filler, mica, talc, and calcium carbonate.

8. The rubber composition according to claim 1, wherein the at least one filler comprises a reinforcing filler comprising at least one of carbon black and silica.

9. The rubber composition according to claim 1, wherein the at least one filler comprises cellulose ester.

10. The rubber composition according to claim 4, comprising at least one halogenated butyl rubber selected from the group consisting of bromobutyl rubber, chlorobutyl rubber, and combinations thereof.

11. The rubber composition according to claim 4, wherein the filler comprises at least one of clay filler, mica, talc, and calcium carbonate.

12. The rubber composition according to claim 4, wherein the at least one filler comprises a reinforcing filler comprising at least one of carbon black and silica.

13. The rubber composition according to claim 4, wherein the at least one filler comprises cellulose ester.

14. A tire innerliner or innertube comprising the rubber composition of claim 4.

15. A tire comprising the tire innerliner or innertube of claim 14.

16. A method for improving at least one of green strength and air permeability of a vulcanized rubber composition used in a tire innerliner or innertube, the method comprising incorporating about 0.1 to about 10 phr of whey protein powder and at least 50 phr of at least one of butyl rubber or halogenated butyl rubber inlcuding at least 50 phr of bromobutyl rubber into the rubber composition that is used in the innerliner.

17. The method of claim 16, wherein the rubber composition in the tire innerliner or innertube further comprises at least one filler in an amount of about 10 to about 200 phr.

18. The method of claim 17, wherein the rubber composition in the tire innerliner or innertube meets at least one of the following:
   a. the filler comprises at least one of clay filler, mica, talc, and calcium carbonate;
   b. the filler comprises reinforcing filler comprising at least one of carbon black and silica; or
   c. the filler comprises cellulose ester.

19. The rubber composition of claim 1, wherein (a) comprises at least 50 phr of bromobutyl rubber.

20. The rubber composition of claim 4, wherein (a) comprises at least 50 phr of bromobutyl rubber.

* * * * *